United States Patent [19]
Emmes et al.

[11] Patent Number: 6,098,122
[45] Date of Patent: Aug. 1, 2000

[54] METHOD AND APPARATUS FOR ADAPTIVELY BLOCKING OUTGOING COMMUNICATION REQUESTS AND ADJUSTING THE BLOCKING FACTOR ACCORDING TO THE VOLUME OF REQUESTS BEING RECEIVED IN AN INFORMATION HANDLING SYSTEM

[75] Inventors: David B. Emmes, Poughkeepsie; Donald W. Schmidt, Stone Ridge, both of N.Y.

[73] Assignee: International Business Machines Corporation, Armonk, N.Y.

[21] Appl. No.: 09/049,513

[22] Filed: Mar. 27, 1998

[51] Int. Cl.[7] .................................................. G06F 13/14
[52] U.S. Cl. ............................. 710/29; 710/29; 710/30; 710/18; 710/20; 709/105; 709/235; 712/201
[58] Field of Search .................................. 710/20, 30, 52, 710/58, 18, 29; 709/105, 235; 712/201

[56] References Cited

U.S. PATENT DOCUMENTS

| | | | |
|---|---|---|---|
| 5,123,091 | 6/1992 | Newman | 395/200 |
| 5,247,517 | 9/1993 | Ross et al. | 370/85 |
| 5,390,299 | 2/1995 | Rege et al. | 395/250 |
| 5,546,543 | 8/1996 | Yang et al. | 395/250 |
| 5,572,520 | 11/1996 | Schenk | 370/60 |
| 5,590,366 | 12/1996 | Bryant et al. | 395/800 |
| 5,598,581 | 1/1997 | Daines et al. | 395/872 |
| 5,602,829 | 2/1997 | Nie et al. | 370/235 |
| 5,602,831 | 2/1997 | Gaskill | 370/252 |
| 5,633,870 | 5/1997 | Gayton et al. | 370/235 |
| 5,644,786 | 7/1997 | Gallagher et al. | 395/850 |
| 5,737,635 | 4/1998 | Daines et al. | 395/872 |
| 5,754,768 | 5/1998 | Brech et al. | 395/200 |
| 5,892,979 | 4/1999 | Shiraki et al. | 395/872 |
| 5,993,056 | 11/1999 | Vaman et al. | 371/37.02 |

FOREIGN PATENT DOCUMENTS

| | | | |
|---|---|---|---|
| 496922 A1 | 8/1992 | Germany | 13/364 |

*Primary Examiner*—Thomas C. Lee
*Assistant Examiner*—Twanna Gossom
*Attorney, Agent, or Firm*—William A. Kinnaman, Jr.

[57] ABSTRACT

A method and apparatus for handling outgoing communication requests in an information handling system in which outgoing communication packets are accumulated into a block that is written to an input/output (I/O) device. For each I/O device there is generated a blocking factor representing a predetermined number of packets that are accumulated before the block is written to the I/O device, as well as a push interval representing a maximum period of time for which any packet in the block can be stalled. Upon the arrival of a new outgoing packet, the packet is added to the block, and the block is written to the I/O device if either the block now contains the predetermined packets or any packet in the packet has been waiting for more than the push interval. A timer running asynchronously with the arrival of outgoing requests periodically pops to write the block to the I/O device if it has been waiting overlong, even if no new requests have arrived. Both the blocking factor and the push interval are periodically adjusted in accordance with the actual throughput so that the blocking factor corresponds to the exact level of consistent parallelism for a given workload.

20 Claims, 2 Drawing Sheets

METHOD AND APPARATUS FOR ADAPTIVELY BLOCKING OUTGOING COMMUNICATION REQUESTS AND ADJUSTING THE BLOCKING FACTOR ACCORDING TO THE VOLUME OF REQUESTS BEING RECEIVED IN AN INFORMATION HANDLING SYSTEM

CROSS-REFERENCE TO RELATED APPLICATION

This application is related to the commonly owned, concurrently filed application of the same inventors, Ser. No. 09/049436, entitled "Method and Apparatus for Selectively Using Input/Output Buffers as a Retransmission Vehicle in an Information Handling System" (docket PO998013), incorporated herein by reference.

BACKGROUND OF THE INVENTION

1. Field of the Invention

This invention relates to a method and apparatus for adaptively blocking outgoing communication requests in an information handling system and, more particularly, to a method and apparatus for adaptively blocking such requests in a client/server system in which a plurality of requesters are operating concurrently.

2. Description of the Related Art

Computer systems use what are known as input/output (I/O) operations to transmit data from a central processing unit (CPU) or main memory to an external device. The external device may be an output device such as a printer, a storage device such as a disk or tape drive, or a communication channel such as a local area network (LAN). There is generally a fixed cost associated with each I/O operation performed. As the amount of data being sent per I/O operation decreases, the fixed overhead of the I/O driver processing becomes proportionally larger relative to the amount of data sent. Many network applications today cause an extremely high frequency of small data requests (possibly mixed with larger amounts of data), such that the overhead incurred by the I/O driver becomes a significant portion of the overall communication stack processing.

Various attempts have been made before to proactively block the outgoing requests, but they have subsequently been abandoned, due to the inability to find the consistent level of parallelism for all possible workloads. The net result of these attempts was that certain workloads would incur unreasonable delays.

SUMMARY OF THE INVENTION

In general, the present invention contemplates a method and apparatus for handling outgoing communication requests in an information handling system in which outgoing communication packets are accumulated into a block that is written to an input/output (I/O) device. For each I/O device there is generated a blocking factor (BF) representing a predetermined number of packets that are accumulated before the block is written to the I/O device, as well as a push interval representing a maximum period of time for which any packet in the block can be stalled. Upon the arrival of a new outgoing packet, the packet is added to the block, and the block is written to the I/O device if either the block now contains the predetermined packets or any packet in the packet has been waiting for more than the push interval. A timer running asynchronously with the arrival of outgoing requests periodically pops to write the block to the I/O device if it has been waiting overlong, even if no new requests have arrived. Both the blocking factor and the push interval are periodically adjusted in accordance with the actual throughput so that the blocking factor corresponds to the exact level of consistent parallelism for a given workload.

The invention contemplates determining the exact level of consistent parallelism for a given workload. This specification calls this value the incremental blocking factor (BF) for the workload. Once the correct blocking factor is known, multiple outgoing requests can be proactively stalled until that blocking factor is reached (without causing significant delay), thereby allowing the I/O driver costs to be amortized across multiple requests. This grouping of requests into blocks occurs between the main CPU processor(s) and the I/O adapter. Depending on the type of communication channel, the adapter may then deblock the group of requests and send them out over the media.

Although the disclosed embodiment is designed for outgoing MVS TCP/IP packets, the invention defined within this specification applies equally well to any communication stack, on any platform, where there is the potential for a high frequency of relatively small outgoing I/O requests.

Just because an adapter reaches a high packet throughput rate, it doesn't mean that blocking is right for that workload. In the case where a single client/server pair are communicating over the adapter, activating blocking could be devastating to the throughput when a request/response model is being used. This is because the first outgoing request would be stalled, waiting for the second to arrive, but since there is only one client, it will never arrive. That is why the invention only keeps blocking active for a given workload if the level of parallelism is consistently maintained. This level of parallelism is directly related to the number of concurrent client/server sessions that are active at any point in time. The goal of the invention is to get close to a "streaming" level of performance, even when there is only a high frequency of small interactive traffic across the adapter.

The invention tracks outgoing packet heuristics, makes decisions based upon those heuristics (i.e., adjusts the incremental blocking factor), and then enforces the decisions that are made. All tracking and decision processing is done on a per-network adapter basis. This allows each adapter to have a unique blocking factor, based upon current load.

Decisions to adjust the incremental blocking factor are made every r number of outgoing requests made (under normal circumstances). Decisions could alternatively be made via a timer, but high frequency timers cause unnecessary overhead. Instead, very responsive decisions are made on the requesters thread of execution, while an outgoing request is being processed.

The tracking of outgoing packet heuristics is implemented by counting the number of outgoing requests, and noting the time-of-day (TOD) interval between decisions. This is then used to determine the average interval between outgoing requests during that decision cycle. The enforcement of decisions is also primarily done during the processing of an outgoing request.

This enforcement comes in two forms. The first, involves determining if the current request "fills" the block. For example, if the current blocking factor is 5 and only 3 packets are pending in the block, then the current request will also be stalled, waiting for the 5th packet. When that packet does arrive, it will "fill" the block, and cause the block to be written immediately. The invention is ignorant of when the size of the data causes the block to be filled with data (thereby causing the block to be written immediately, independent of the number of requests it contains).

The second form of enforcement involves maintaining an adaptive "push interval" in addition to the BF value. When a decision is made, the maximum interval that a packet should be delayed is also calculated (described in more detail later). If at the time of a new outgoing request, a block has been pending for more than the target push interval, then that block is pushed out immediately, independent of the number of packets it contains.

As can be seen from the above, there is very low overhead involved in both tracking, and enforcing blocking factor decisions in the mainline flow. This invention does assume however that a very efficient method of serializing the concurrent access to the outgoing I/O buffer is used, otherwise the performance gains obtained by blocking may be reduced.

The current workload defines the average packet throughput rate that must be maintained in order to keep blocking active for that adapter. For example, if a given adapter reaches 1000 packets per second before it enters blocking (i.e., a blocking factor >1), then the adapter must maintain at least that rate when the incremental blocking factor is increased. Otherwise, the blocking factor will be decreased, which may switch the adapter back to non-blocking mode. The current workload must consistently exceed the entry-level minimum requirement of e sustained packets per second before blocking will even be considered.

Blocking factor decisions are based upon two factors: the average interval between outgoing requests; and the average interval between outgoing blocks. It takes g consecutive good decision cycles to cause the incremental blocking factor to be increased. It takes b bad decision cycles to cause the blocking factor to be decreased (a value of g being greater than b has proved to be the most effective). For a decision cycle to be considered good, both the outgoing request rate, and the block rate (related to the push interval described above) must be within f percent of the target rates calculated when the BF was last increased, otherwise it is considered bad. By including the block rate in the decision process, we are assured that BF increases do not cause excessive throughput delays.

Since the invention proactively stalls outgoing requests, preferably there is some mechanism to ultimately drive out stalled requests if the request being waited for never arrives. The mechanism used in the disclosed embodiment is a last-resort timer which fires every t ms, to drive out pending blocks as required. This timer uses the push interval described above to see if a block has been pending too long. If the invention is working correctly, this timer will most often find nothing to do.

The push interval is initially calculated very conservatively to insure the invention can quickly detect when blocking is not appropriate for a given workload (i.e., a high frequency of requests, but little to no consistent parallelism). Once the workload sustains blocking using the conservative model, the invention switches to a more aggressive model which attempts to get the highest possible blocking factor within an i ms interval.

If BF increases have been consistently determined to be bad for a given workload, then future increase attempts are delayed, to avoid the performance degradation that occurs every time a bad BF increase occurs. This delay is implemented by defining an adaptive multiplier to the g good decision cycles required to increase the blocking factor. By increasing this multiplier every time a BF increase is considered bad (capped at some value), subsequent BF increase attempts are effectively delayed. This multiplier is only relevant to a given blocking factor value (i.e., bad experiences with a BF of 4 should be forgotten when the BF is reduced to 3).

If the current BF is no longer appropriate due to a downturn in outgoing request throughput, then a decision can be made earlier than the normal request-based cycle. This decision is made by the push interval enforcing routine, by counting the number of times a block had to be pushed out because it exceeded the target push interval (includes f percent fudge factor to allow for some variation) calculated during the previous decision cycle. When the push count reaches a threshold value within a decision cycle, a decision is made immediately to decrease the blocking factor. If the BF has very recently been increased, then the threshold value is smaller than it normally would be (i.e., decreases BF more aggressively).

A second level of decision making is performed to complete the invention. The decision making up to this point is both fairly aggressive, and low level. It is aggressive because it ultimately attempts to get the highest possible BF within a i ms interval. It is low level because it is based directly upon the average request/block throughput rates. If left to its own, the above portion of the invention would produce widely varying BFs, even for a steady workload, due to its immediate nature. For example, for a fairly heavy workload it may determine that a BF of 8 is good for a short interval, but then it finds that blocking the requests at that rate causes starvation because that is not the consistent level of parallelism for that workload, so the invention would subsequently lower the BF. This oscillation in BFs has a negative impact on performance because whenever a bad decision is made (i.e., a packet is stalled too long), it takes time to adjust the BF back to what it should be.

To stop this oscillation, a conservative governor is integrated into the invention. This governor uses the output of the lower level decisions as its sampling set, to determine the consistent level of parallelism for a given workload. The governor sampling set is implemented by maintaining counts of the results of each of the lower level decision cycles. Each time a lower level decision is made, the count associated with the resulting BF is incremented. When any one count exceeds a threshold value (i.e., the lower level decisions are focusing on a particular BF), a new governor level decision is made.

The governor portion of the invention defines the highest possible BF that can be set at a given point in the life cycle of a workload. The lower level decision making is restricted to making a decision ranging from 1 to the current governor BF. The governor value is initially set to a low value, until the workload has been consistent enough to warrant increasing the governor BF. The ideal distribution of the lower level decisions occurs when the majority of the decisions made, fall close to the governor BF value. When this is sustained (i.e., c consecutive good governor BF samples) the governor BF value is increased by 1, thereby giving the lower level decision processing one more option to chose from. When the distribution of the lower level decisions is any but ideal, the governor BF value is immediately reduced.

Once the governor BF reaches its highest point for a given workload, the invention has determined the exact level of consistent parallelism for that workload. This value produces optimal throughput results in that it minimizes delay, while at the same time minimizing the overhead required to satisfy the high frequency of outgoing requests.

This invention determines the exact level of consistent parallelism for any workload, as it changes over time. Once this blocking factor is known, the I/O driver costs can be effectively amortized by proactively stalling outgoing requests, without incurring any significant delays. The net effect of applying this invention is unique, in that the harder you push the adapter, the more efficient the communication with that adapter becomes. An interesting external phenomenon in fact occurs during stress testing when this invention is applied correctly. Specifically, a given null transaction workload can cause the CPU to become 100% busy, but this invention then allows significant new workload to be added without incurring any additional delay, while using the same 100% of the CPU.

DESCRIPTION OF THE PREFERRED EMBODIMENT

Figure 1:
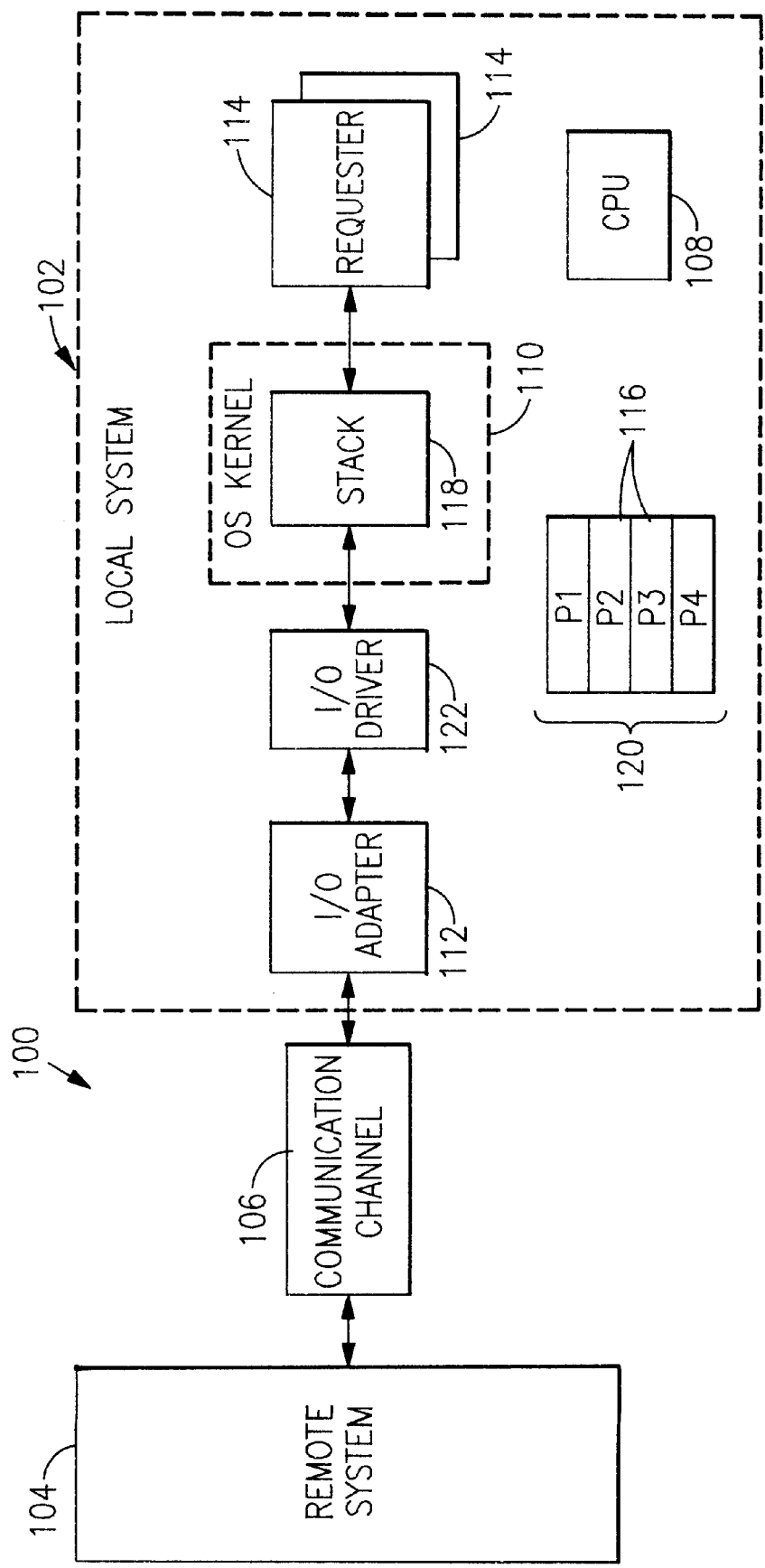
FIG. 1 shows a computer system incorporating the present invention.

FIG. 1 shows a typical configuration 100 in which the present invention may be used. In the configuration 100, a first computer system 102 (the "local" system) communicates with a remote system 104 via a communication channel 106. Communication channel 106 may be of any suitable type known to the art, such as a local area network (LAN), a point-to-point connection or the like; the particulars of its construction form no part of the present invention.

Local system 102 may be a server system servicing a remote client system 104, although the particular allocation of client functions and server functions among systems 102 and 104 forms no part of the present invention. Local system 102 is referred to as such because it is assumed to be transmitting data to remote system 104 and is therefore the system of interest in explaining the present invention. In an actual configuration, remote system 104 may be similarly equipped for when it assumes a transmitting role. Local system 102 has the usual components of a programmed general-purpose computer system (as does remote system 104), including a central processing unit (CPU) 108, an operating system (OS) kernel 110, an input/output (I/O) adapter or subsystem 112 coupling the system to communication channel 106, and one or more requesters 114 that issue communication requests to OS kernel 110. Requesters 114 may be different processes (either different applications or multiple instances of the same application), different threads of the same process, or a combination of both. In the embodiment shown, local system 102 comprises an IBM S/390™ server such as an S/390 Parallel Enterprise Server™0 G3 or G4, while OS kernel 110 comprises the IBM OS/390™ operating system. However, the invention is not limited to any particular platform.

Requesters 114 issue communication requests to a communication stack 118 (e.g., a TCP/IP stack) of the OS kernel 110. Communication stack 118 constructs packets 116 containing the user data which are assembled into blocks 120 containing one or more packets 116. After it has assembled a block 120 of the desired size, communication stack 118 calls an I/O driver 122, a software component that transfers the block 120 from the buffer storage of the communication stack to the I/O adapter 112.

Figure 2:
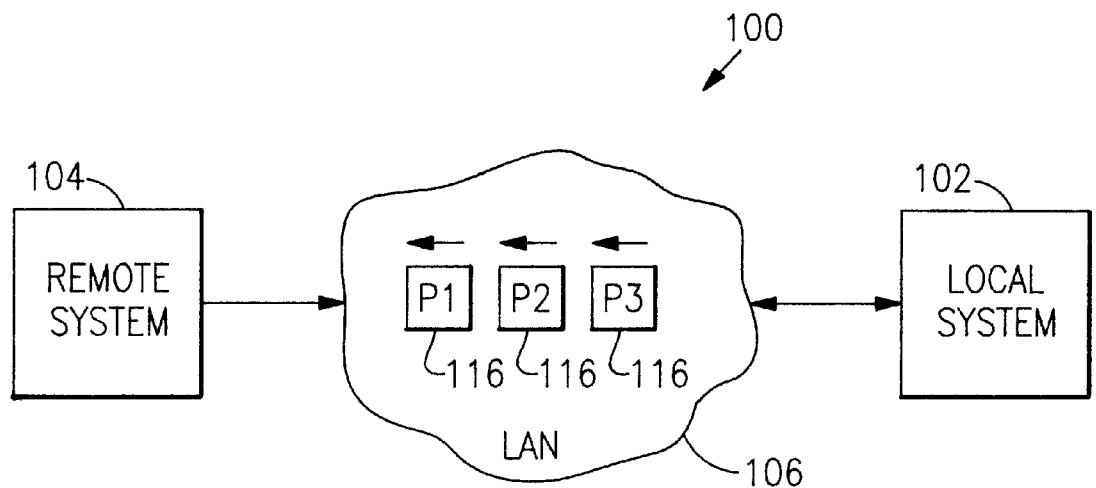
FIG. 2 shows the packet flow in a system in which the communication channel comprises a local area network.
Figure 3:
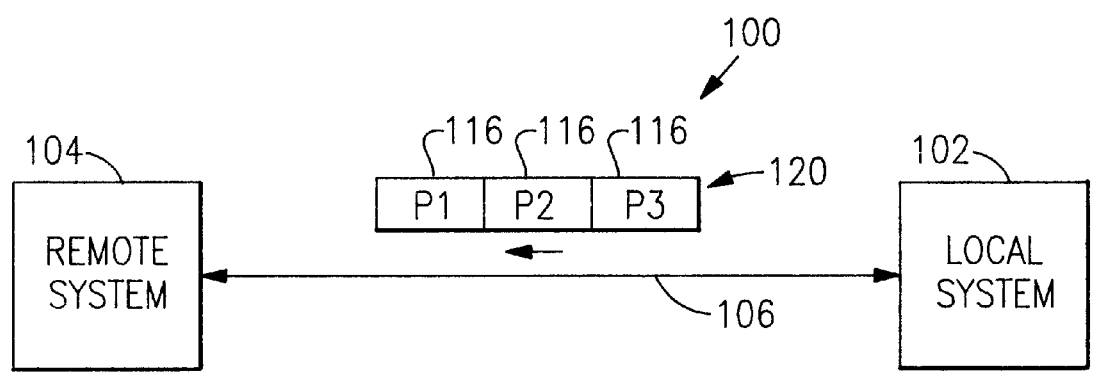
FIG. 3 shows the packet flow in a system in which the communication channel comprises a point-to-point connection.

The manner in which the blocks 120 are handled by the I/O adapter 112 depends on the type of communication channel 106, among other factors. Thus, referring to FIG. 2, if communication channel 106 is a local area network (LAN), then the local I/O adapter 112 may deblock (or unblock) the packets 116 and transmit them separately over the communication channel. On the other hand, referring to FIG. 3, if communication channel 106 is a point-to-point connection, then local I/O adapter 112 may send the packets 116 as blocks 120 to the remote system, whose own I/O adapter (not separately shown) unblocks the packets.

Further details of the operation of the communication stack 118 may be found in the related application referred to above, incorporated herein by reference.

Pseudocode listings 1–8 in the Appendix show the procedure of a preferred embodiment of the present invention. The procedure is executed by the communication stack 118, either upon receiving a communication request from a requester 114 or asynchronously, depending on the operation involved.

The procedure uses the following control structures on a per blocking device (i.e., I/O adapter 112) basis. All fields but the flags are integers. All fields are initialized to zero unless otherwise noted.

902 Current_BF: Current Blocking Factor for device (initialized to 1).

903 Goal_Met_Count: Number of times throughput goals were met since last increase of the Current_BF (intervening decrements cause this field to be reset).

904 Write_Count: Number of packet requests made since last decision.

905 Target_Interval: Current target packet throughput interval. This target throughput rate (and the Push_Interval which is based upon it) must be consistently maintained to keep the current BF value.

906 Push_Count: Number of times block 120 was pushed out due to exceeding the target Push_Interval (907) since last decision.

907 Push_Interval: Interval between block writes that must be maintained in order to keep the current BF.

908 Probation_Flag: Flag indicating that BF was just increased. It is used to determine if a recent increase was "bad".

909 Aggressive_Flag: Flag stating that there has been enough consistent parallelism to maintain blocking using the conservative Push_Interval calculation. When set, attempt to reach the highest possible BF, bounded by both MAX_DELAY_INTERVAL and the current Governor_BF (914).

910 Consecutive_Decr_Flag: Flag used to determine when previous bad history for a given BF (i.e., Goal_Met_Multiplier) should be cleared.

911 Goal_Met_Multiplier: Multiplier used to delay future Current_BF increases because recent increase attempts have consistently proven to be "bad" (initialized to 1).

912 Historical_Thruput(MAX_BF): Array containing the packet throughput interval that was reached when the Current_BF was last incremented. This is primarily used during decrement Current_BF processing to determine what the Target_Interval should be for the newly decremented BF.

913 Decision_TOD: TOD at time last decision was made. Preferably in units no greater than 16 microseconds.

914 Governor_BF: Highest BF the low level decision processing has to choose from (i.e., the consistent level of parallelism for this work load). Initialized to MIN_GOVERNOR_BF.

915 Governor_Goal_Met_Count: Number of times throughput goal was met since last increase of the Governor_BF (intervening decrements cause this field to be reset).

916 BF_Decisions_Sampling_Set(MAX_BF): Array used as input to the Governor_BF decision making. It contains counts of the resulting Current_BF after each low-level decision cycle is made.

917 Aggressive_Decrement_Count: Number of consecutive decrements that have occurred (i.e., without an intervening increment) while using the aggressive Push_Interval calculation.

The following static values are also used (on either a per device or global basis):

918 AGGRESSIVE_THRESHOLD: Threshold value of Aggressive_Decrement_Count 917 beyond which operation reverts to conservative model.

919 DECISION_CYCLE_THRESHOLD: Number of packet requests between decisions to raise or lower Current_BF 902. Corresponds to the value r.

920 ENTRY_LEVEL_BLOCKING_INTERVAL: Minimum (and initial) value of Target_Interval 905. Corresponds to the value e.

921 FUDGE_FACTOR: Used when calculating the Push_Interval. It is really f percent of the product of the Current_BF and the Target_Interval.

921a FUDGE_FACTOR2: Used when calculating the Target_interval. It is really f percent of the Target_Interval.

922 GOAL_MET_THRESHOLD: Minimum value of Goal_Met_Count 903 for Current_BF 902 to be raised. Corresponds to value g.

923 GOVERNOR_DECISION_THRESHOLD: Value of BF_DECISIONS SAMPLING_SET(x) 916 causing a governor decision to be made.

923a GOVERNOR_GOAL_MET_THRESHOLD: Value of Governor_Goal_Met_Count 915 for Governor_BF 914 to be raised. Corresponds to value c.

924 MAX_BF: Upper bound on Governor_BF 914.

925 MAX_DELAY_INTERVAL: Upper bound on Push_Interval 907.

926 MAX_MULTIPLIER: Upper bound on Goal_Met_Multiplier 911.

927 MAX_PROBATION_STALL_INTERVAL: Probation threshold value of Stalled_Interval beyond which Current_BF 902 is decremented.

928 MIN_GOVERNOR_BF: Minimum (and initial) value of Governor_BF 914.

929 PUSH_THRESHOLD: Threshold value of Push_Count 906 beyond which Current_BF 902 is decremented.

Listing 1 shows the mainline packet write flow routine 100. This routine 100 is performed by a layer of the communication stack 118 that receives a request from another layer of the stack that has created a packet 116 in response to a request from a requester 114.

Upon receiving an outgoing packet, the routine 100 adds the packet 116 to the current block 120 (step 101) and determines whether the block 120 is to be considered "full" due to reaching Current_BF 902, using the routine shown in Listing 2 (step 110). If the block 120 is not "full", then the routine 100 determines whether the block 120 must be pushed out due to its being stalled too long as determined from Push_Interval 907, using the routine shown in Listing 7 (step 120). If the block 120 is "full" or must be "pushed out", then the routine 100 causes the block 120 to be written by calling the device driver 122 for the I/O adapter 112 (step 121).

A separate routine implements an asynchronous last-resort timer that loops through all pending blocks 120 (one for each device 112 that is blocking data) to write blocks 120 that have been stalled too long because Current_BF 902 was not met (step 130).

Listing 2 shows the routine 110 for determining if the block 120 is "full". Initially, the routine 110 increments the count (Write_Count 904) of packets 116 written to the device 112. If Write_Count 904 reaches DECISION_CYCLE_THRESHOLD 919, then the routine 110 calls the "Make BF Decision" routine 210 shown in Listing 3 and zeros Write_Count 904 and Push_Count 906 (step 202). If Write_Count 904 modulo Current_BF 902 is zero, then the routine 110 informs the caller that the block 120 is "full" (step 203).

Listing 3 shows the "Make BF Decision" routine 210 invoked at step 202 of routine 110. The routine 210 initially serializes at least on a per device basis if required (step 301). The routine 210 then calculates the time since the decision was made for this device (Elapsed_Time) by subtracting Decision_TOD 913 from the current time-of-day (TOD) Current_TOD (step 302). The routine 210 then sets Decision_TOD equal to Current TOD (step 303) and calculates the average time between packet requests (the packet throughput interval) by dividing Elapsed_Time by Write_Count 904 (step 304). Next, the routine 210 calculates the average time between block writes (the block throughput interval) by dividing Elapsed_Time by Write_Count/Current_BF 902 (step 305). The routine then determines target throughput intervals for both packets 116 and blocks 120 (step 306).

If Current_BF 902 is greater than 1 or there is a history of BF "bad" increments (i.e., Goal_Met_Multiplier 911≠1), then the routine 210 sets the target packet throughput interval (Target_Interval 905) equal to the sum of the Target_Interval that caused the most recent increase of Current_BF 902 and FUDGE_FACTOR2 921a, and sets the target block throughput interval (Push_Interval 907) equal to the Push_Interval calculated during most recent action on Current_BF at step 408 or 510 (step 307). Otherwise, the routine 210 sets both the target block throughput interval (Push_Interval 907) and the target packet throughput interval (Target_Interval 905) equal to ENTRY_LEVEL_BLOCKING_INTERVAL 920 (step 308).

If both target throughputs are met, then the routine 210 invokes the "Consider BF Increment" routine 320 shown in Listing 4 (step 309). Otherwise, the routine 210 invokes the "Consider BF Decrement" routine 330 shown in Listing 5 (step 310).

The routine 210 then records the latest BF decision in the BF_Decisions_Sampling_Set array 916 (i.e., increments BF_Decisions_Sampling_Set(Current_BF) by 1) (step 311). If BF_Decisions_Sampling_Set(Current_BF) is greater than GOVERNOR_DECISION_THRESHOLD 923, then the routine 210 calls the "Set Governor BF processing" routine 340 shown in Listing 8 (step 312). Finally, the routine 210 unserializes if it serialized above at step 301 (step 313).

Listing 4 shows the "Consider BF Increment" routine 320. At step 401, if Probation_Flag 908 is ON, the routine 320 sets Probation_Flag equal to OFF and sets Goal_Met_Multiplier 911 equal to 1. The routine then increments Goal_Met_Count 903 (step 402). If Goal_Met_Count 903 is greater than the product of GOAL_MET_THRESHOLD 922 and Goal_Met_Multiplier 513 (step 403), then the routine 320 performs some or all of steps 404–410; otherwise, it jumps to step 411.

At step 404, if Current_BF 902 is less than Governor_BF 914 (340), then the routine 320 performs some or all of steps 405–410; otherwise, the routine jumps to step 411.

At step 405, the routine 320 saves the current packet throughput interval that must be maintained to keep Current_BF (i.e., stores it as the Historical_Thruput (Current_BF) entry of array 912 and as Target_Interval 905). The routine 320 then increments the Current_BF 902 for this device (i.e., I/O adapter 112) (step 406) and sets Probation_Flag 908 equal to ON (step 407). The routine then calculates a new target block throughput interval (Push_Interval 907) (step 408). If the conservative model is active (i.e., Aggressive_Flag 909=OFF), then the routine 320 sets Push_Interval 907 equal to Current_BF * Target_Interval+FUDGE_FACTOR 921 (capped by MAX_DELAY_INTERVAL 925) (step 409). Otherwise (Aggressive_Flag=ON), the routine 320 sets Push_Interval 907 equal to MAX_DELAY_INTERVAL 925 (step 410).

Finally, the routine 320 zeros Goal_Met_Count 903 and Aggressive_Decrement_Count 917 and sets Consecutive_Decr_Flag 910 equal to OFF (step 411).

Listing 5 shows the "Consider BF Decrement" routine 330. At step 501, the routine 330 zeros Goal_Met_Count 903. If Current_BF 902 is greater than 1 (step 502), then the routine 330 performs some or all of steps 503–515. Otherwise, it jumps to step 516.

At step 503 the routine 330 decrements Current_BF 902 by 1. The routine then restores the target packet throughput interval to the value before the most recent BF increase (i.e., Target_Interval 905=Historical_Thruput(Current_BF)) (step 504). Next, the routine 320 recalculates the target block throughput interval (Push_Interval 907), using the routine shown in Listing 6 (step 510). If the decrement occurred immediately after an increment (i.e., Probation_Flag 908=ON) (step 511), then the routine 330 performs steps 512–515.

At step 512, the routine 330 sets Probation_Flag 908 equal to OFF. The routine 330 then increments Goal_Met_Multiplier 911 (bounded by MAX_MULTIPLIER 926) to delay future increase attempts, as the most recent increment was "bad" (i.e., the throughput rate was high, but the parallelism not consistent) (step 513). If Goal_Met_Multiplier 911 is being increased consistently (i.e., Goal_Met_Multiplier 911 modulo some value>1=0), if the conservative push interval model is active (i.e., Aggressive_Flag 909=OFF), and if Current_BF 902>1, then we have reached the highest possible BF using the conservative push interval calculation method, and consistent parallelism exists (step 514). The routine 330 therefore switches into the aggressive push interval model (i.e., sets Aggressive_Flag=ON) (step 515).

As noted above, control passes to step 516 if Current_BF 902 is 1. The action taken at this point depends on whether there has been a previous bad history of BF increments. If there has been no previous bad history of BF increments (i.e., Goal_Met_Multiplier=1)), then the routine 330 resets Target_Interval 905 equal to ENTRY_LEVEL_BLOCKING_INTERVAL 920 (step 517). If there has been a previous bad history, the routine 330 keeps the throughput rates that caused entry to blocking as the target throughputs (i.e., the last BF increment for this throughput was "bad", therefore don't reconsider incrementing Current_BF 902 until this level of throughput is exceeded) (step 518).

Listing 6 shows the routine 510 for recalculating Push_Interval 907. At step 601, if the conservative model is active (i.e., Aggressive_Flag 909=OFF), the routine 510 sets Push_Interval 907=(Current_BF 902 * Target_Interval 905)+FUDGE_FACTOR 921 (where FUDGE_FACTOR 921=Current_BF * Target_Interval * f) and skips to step 605.

If, on the other hand, Aggressive_Flag 909 is ON, the routine 510 performs steps 602–604 before proceeding to step 605. At step 602, the routine 510 increments Aggressive_Decrement_Count 917. At step 603, if Aggressive_Decrement_Count 917 is greater than AGGRESSIVE_THRESHOLD 918, then the routine recalculates Push_Interval 907 using the conservative model (601), sets Aggressive_Flag 909 equal to OFF, and zeros Aggressive_Decrement_Count 917. Otherwise, the routine 510 takes no immediate action on Push_Interval 907 (i.e., waits until a switch back to the conservative model occurs).

At step 605, if Consecutive_Decr_Flag 910 is ON, then the routine sets Goal_Met_Multiplier 911 equal to 1 and sets Consecutive_Decr_Flag 910 equal to OFF. Otherwise, the routine 510 sets Consecutive_Decr_Flag equal to ON.

Listing 7 shows the routine 120 for determining whether the block 120 must be pushed out. The routine 120 first calculates Stalled_Interval by subtracting the TOD of when the first packet 116 was written to the stalled block 120 from the current TOD (step 701). If the block 120 has been stalled longer than the Push_Interval 907 calculated at step 408 (step 702), then the routine 120 informs the caller that the block 120 must be "pushed out" (step 703). If Current_BF 902 was recently increased (i.e., Probation Flag=ON) and Stalled_Interval is greater than MAX_PROBATION_STALL_INTERVAL 927, then the routine 120 notes that a decrement is required (step 704). Otherwise (step 705), the routine 120 increments Push_Count 906 (step 706) and, if Push_Count is greater than PUSH_THRESHOLD 929 (step 707), notes that a decrement is required (step 708).

If a decrement is required (step 709), then the routine 120 serializes at least on a per device basis if required (step 710) and performs steps 711–713 before unserializing at step 714. At step 711 the routine 120 calls the "Consider BF decrement" routine 320 and zeros Write_Count 904 and Push_Count 712. At step 712 the routine 120 records the latest BF decision in the BF_Decisions_Sampling_Set array 916 (i.e., increments BF_Decisions_Sampling_Set(Current_BF) by 1). At step 713, if the array entry BF_Decisions_Sampling_Set(Current_BF) is greater than GOVERNOR_DECISION_THRESHOLD 923, then the routine 120 calls the "Set Governor BF processing" 340 shown in Listing 8. Finally, the routine 120 unserializes if it serialized above at step 710 step 714).

Listing 8 shows the "Set Governor BF Processing" routine 340 invoked from step 713 of routine 120 or step 312 of routine 210. At step 801 the routine calculates the total number of decisions made since the last Governor decision was made by summing the counts within the BF_Decisions_Sampling_Set array 916.

If the majority of the decisions made during the last governor decision cycle are close to Governor_BF 914 (step 802), the routine 340 increments Governor_Goal_Met_Count 915 (step 803) and, if Governor_Goal_Met_Count 915 is greater than GOVERNOR_GOAL_MET_

THRESHOLD 923a (step 804), increments Governor_BF 914 (bounded by MAX_BF 924) and zeros Governor_Goal_Met_Count 915, thereby giving the low-level decision making one more BF to choose from (step 805).

On the other hand, if the majority of the decisions made during the last governor decision cycle are far below Governor_BF 914 (step 806), then the routine 340 decrements Governor_BF 914 by 2 (bounded by MIN_GOVERNOR_BF 928) and zeros Governor_Goal_Met_Count 915 (step 807).

If neither of these circumstances obtain (i.e., performance is neither good nor very bad) (step 808), then the routine 340 decrements Governor_BF 914 by 1 (bounded by MIN_GOVERNOR_BF 928) and zeros Governor_Goal_Met_Count 915 (step 809).

After performing steps 802–805, 806–807 or 808–809, the routine 340 clears the BF_Decisions_Sampling_Set array 916 to prepare for next Governor_BF decision (step 810).

The invention is preferably implemented as software (i.e., a machine-readable program of instructions tangibly embodied on a program storage device) executing on a hardware machine. While a particular embodiment has been shown and described, it will be apparent to those skilled in the art that various modifications may be made without departing from the spirit of the invention.

APPENDIX

LISTING 1: 100 Mainline Packet Write Flow

```
101   Add packet to current block
110   Determine if block is to be considered "full" due to reaching
      the Current_BF(902)
120   If (not "full") Then
          Determine if block must be pushed out due to it being stalled too long
          (Push_Interval(907))
121   If (block is "full" or must be "pushed out") Then
          Cause block to be written
130   Implement an asynchronous last resort timer that loops through all
      pending blocks (one for each device that is blocking data) to
      write blocks that have been stalled too long because the Current_BF
      was not met
```

LISTING 2 110 Determine if Block is "Full"

```
201   Increment Write_Count(904) of packets written to this device
202   If (Write_Count reaches the DECISION_CYCLE_THRESHOLD) Then
          Call "Make BF decision" (210), and zero Write_Count, Push_Count(906)
203   If (Write_Count modulo the Current_BF(902) = 0) Then
          Inform caller that block is "full"
```

LISTING 3: 210 "Make BF Decision"

```
301   Serialize at least on a per device basis (if required)
302   Calculate time since decision was made for this device (Elapsed_Time)
      by subtracting the Decision_TOD(913) from the Current_TOD
303   Set Decision_TOD = Current_TOD
304   Calculate average time between packet requests (packet throughput interval)
      by dividing Elapsed_Time by Write_Count(904)
305   Calculate average time between block writes (block throughput interval)
      by dividing the Elapsed_Time by (Write_Count/Current_BF(902))
306   Determine target throughput intervals for both packets, and blocks
307       If (Current_BF(902) > 1 OR There is a history of BF "bad" increments
              (i.e., Goal_Met_Multiplier(911) -= 1)) Then
            . Set Target packet throughput interval = Throughput that caused the
                  most recent increase of the Current_BF (405) (504)
                  (i.e., Target_Interval) + FUDGE_FACTOR
            . Set Target block throughput interval = Push_Interval(907) calculated
                  during most recent action on the Current_BF (408) (510)
308       Else
            . Set Target block, and packet throughput intervals =
                  ENTRY_LEVEL_BLOCKING_INTERVAL
309   If (Both target throughputs are met) Then "Consider BF increment" (320)
310   Else "Consider BF decrement" (330)
311   Record latest BF decision in the BF_Decisions_Sampling_Set(916) array
      (i.e., increment BF_Decisions_Sampling_Set(Current_BF) by 1)
312   If (BF_Decisions_Sampling_Set(Current_BF) > GOVERNOR_DECISION_THRESHOLD)
          Then Call "Set Governor BF processing" (340)
313   Unserialize if serialized above
```

LISTING 4: 320 "Consider BF Increment"

```
401   If (Probation_Flag(908) = ON) Then
keep
Current_BF
(i.e.,
store it
into
the
Current_BF(902)
entry
of the
```

APPENDIX-continued

```
Historical_Thruput(912)
array,
and
into
Target_Interval(905))
406      . Increment the Current_BF for this device
407      . Set Probation_Flag = ON
408      . Calculate new target block throughput interval (Push_Interval(907))
409           .    If (Conservative model active (i.e., Aggressive_Flag(909) = OFF)) Then
              .    . Set Push_Interval = Current_BF *
                       Target_Interval + FUDGE_FACTOR
                       (capped by MAX_DELAY_INTERVAL)
410           .    Else (Aggressive_Flag = ON)
              .    . Set Push_Interval = MAX_DELAY_INTERVAL
411           Zero Goal_Met_Count, Aggressive_Decrement_Count(917), and
                  Set Consecutive_Decr_Flag(910) = OFF
LISTING 5: 330 "Consider BF Decrement"

501      Zero Goal_Met_Count(903)
502      If (Current_BF(902) > 1) Then
503           Decrement Current_BF by 1
504           Restore Target packet throughput interval to value before the most recent
                  BF increase
                  (i.e., Target_Interval(905) = Historical_Thruput(Current_BF))
510           Recalculate target block throughput interval (Push_Interval(907))
511           If (decrement occurred immediately after an increment
                  (i.e., Probation_Flag(908) = ON)) Then
512           . Set Probation_Flag = OFF
513           . Increment the Goal_Met_Multiplier(911) (bounded by MAX_MULTIPLIER) to
                     delay future increase attempts, as most recent increment was "bad"
                     (i.e., throughput rate high, but parallelism not consistent)
514           . If (the Goal_Met_Multiplier is being increased consistently
                        (Goal_Met_Multiplier modulo some value > 1 = 0)
                     AND the conservative push interval model is active
                        (i.e., Aggressive_Flag(909) = OFF)
                     AND Current_BF > 1) Then
                        (i.e., we have reached the highest possible BF using the
                        conservative push interval calculation method, and consistent
                        parallelism exists)
515           .    Switch into the aggressive push interval model
                        (i.e., Set Aggressive_Flag = ON)
516      Else (Current_BF = 1)
517           When (no previous bad history of BF increments
                        (i.e., Goal_Met_Multiplier = 1))
              . Reset Target_Interval = ENTRY_LEVEL_BLOCKING_INTERVAL
518           When (Previous bad history)
              . Keep throughput rates that caused entry to blocking as the target
                     throughputs (i.e., last BF increment for this throughput was "bad", there-
                     fore don't reconsider incrementing the Current_BF until this level of
                     throughput is exceeded)
LISTING 6: 510 Recalculate Push Interval 601      If (Conservative model active (i.e., Aggressive_Flag(909) = OFF)) Then
              Set Push_Interval(907) = Current_BF(902) *
                  Target_Interval(905) + FUDGE_FACTOR
602      Else (Aggressive_Flag = ON)
              Increment Aggressive_Decrement_Count(917)
603           If (Aggressive_Decrement_Count > AGGRESSIVE_THRESHOLD) Then
                  .    Recalculate Push_Interval using the conservative model (601)
                  .    Set Aggressive_Flag = OFF, and zero Aggressive_Decrement_Count
604           Else Take no immediate action on Push_Interval
                     (i.e., wait until switch back to the conservative model occurs)
605      If (Consecutive_Decr_Flag = ON) Then
              Set Goal_Met_Multiplier(911) = 1
              Set Consecutive_Decr_Flag = OFF
606      Else Set Consecutive_Decr_Flag = ON
LISTING 7: 120 Determine if Block must be Pushed Out 701      Calculate Stalled_Interval by subtracting the TOD of when the first packet
              was written to the stalled block, from the current TOD
702      If (block has been stalled longer than the Push_Interval(907) (408)) Then
703           Inform caller that block must be "pushed out"
704           If (Current_BF(902) was recently increased (i.e., Probation_Flag = ON)
                  AND Stalled_Interval > MAX_PROBATION_STALL_INTERVAL) Then
                  . Note Decrement required
705           Else
706           . Increment Push_Count(906)
707           . If (Push_Count > PUSH_THRESHOLD) Then
708                 .    Note Decrement required
```

APPENDIX-continued

```
709        If (Decrement required) Then
710          . Serialize at least on a per device basis (if required)
711          . Call "Consider BF decrement" (320), and zero Write_Count (904),
                Push_Count
712          . Record latest BF decision in the BF_Decisions_Sampling_Set(916) array
                (i.e., increment BF_Decisions_Sampling_Set(Current_BF) by 1)
713          . If (BF_Decisions_Sampling_Set(Current_BF) >
                    GOVERNOR_DECISION_THRESHOLD) Then
               . Call "Set Governor BF processing" (340)
714          . Unserialize if serialized above
LISTING 8: 340 "Set Governor BF Processing"

801     Calculate total number of decisions made since last Governor decision was
        made by summing the counts within the BF_Decisions_Sampling_Set(916) array
802     When (The majority of the decisions made during the last Governor
            decision cycle are close to the Governor_BF(914)) Then
803        Increment Governor_Goal_Met_Count(915)
804        If (Governor_Goal_Met_Count > GOVERNOR_GOAL_MET_THRESHOLD) Then
805          . Increment Governor_BF (bounded by MAX_BF), and zero
               Governor_Goal_Met_Count, thereby giving the low level decision making
               one more BF to choose from
806     When (The majority of the decisions made during the last Governor
            decision cycle are far below the Governor_BF) Then
807        Decrement the Governor_BF(914) by 2 (bounded by MIN_GOVERNOR_BF),
               and zero Governor_Goal_Met_Count
808     Otherwise (neither good or very bad)
809        Decrement the Governor_BF(914) by 1 (bounded by MIN_GOVERNOR_BF),
               and zero Governor_Goal_Met_Count
810     Clear BF_Decisions_Sampling_Set array to prepare for next Governor_BF
           decision
```

What is claimed is:

1. In an information handling system in which outgoing communication requests are accumulated into a block that is written to an input/output (I/O) device, a method of handling outgoing communication requests, comprising the steps of:

accumulating outgoing communication requests into a block;

generating a blocking factor representing a predetermined size that is attained before the block is written to the I/O device;

writing the block to the I/O device when it has attained the predetermined size; and dynamically adjusting the blocking factor in accordance with the volume of the requests.

2. The method of claim 1 in which the blocking factor represents the number of requests accumulated into a block before the block is written to the I/O device.

3. The method of claim 1 in which the writing step comprises the steps of:

determining whether a new request produces a block of the predetermined size; and writing the block to the I/O device if the new request produces a block of the predetermined size.

4. The method of claim 3 in which the writing step comprises the further steps of:

determining whether any request in the block has been stalled in the block for more than a predetermined interval; and writing the block to the device if any request in the block has been stalled in the block for more than the predetermined interval.

5. The method of claim 4 in which the determination of whether any request in the block has been stalled in the block for more than a predetermined interval is made upon the arrival of a new request.

6. The method of claim 4 in which the determination of whether any request in the block has been stalled in the block for more than a predetermined interval is made asynchronously with respect to the arrival of new requests.

7. The method of claim 1 in which the adjusting step is performed upon an expiration of a predetermined period of time.

8. The method of claim 1 in which the adjusting step is performed upon processing a predetermined number of requests.

9. The method of claim 1 in which the adjusting step comprises the steps of:

determining an actual throughput rate for the requests;

comparing the actual throughput rate with a target throughput rate for the requests; and modifying the blocking factor in accordance with the comparison of the actual throughput rate with the target throughput rate.

10. The method of claim 9 in which the modifying step comprises the step of:

counting the number of times that a block remains stalled for more than a predetermined interval; and decrementing the blocking factor if a block remains stalled for more than a predetermined interval more than a predetermined number of times.

11. In an information handling system in which outgoing communication requests are accumulated into a block that is written to an input/output (I/O) device, apparatus for handling outgoing communication requests, comprising:

means for accumulating outgoing communication requests into a block;

means for generating a blocking factor representing a predetermined size that is attained before the block is written to the I/O device;

means for writing the block to the I/O device when it has attained the predetermined size; and means for dynamically adjusting the blocking factor in accordance with the volume of the requests.

12. The apparatus of claim 11 in which the writing means comprises:
   means for determining whether a new request produces a block of the predetermined size; and
   means for writing the block to the I/O device if the new request produces a block of the predetermined size.

13. The apparatus of claim 12 in which the writing means further comprises:
   means for determining whether any request in the block has been stalled in the block for more than a predetermined interval; and
   means for writing the block to the device if any request in the block has been stalled in the block for more than the predetermined interval.

14. The apparatus of claim 11 in which the adjusting means comprises:
   means for determining an actual throughput rate for the requests;
   means for comparing the actual throughput rate with a target throughput rate for the requests; and
   means for modifying the blocking factor in accordance with the comparison of the actual throughput rate with the target throughput rate.

15. The apparatus of claim 14 in which the modifying means comprises:
   means for counting the number of times that a block remains stalled for more than a predetermined interval; and
   means for decrementing the blocking factor if a block remains stalled for more than a predetermined interval more than a predetermined number of times.

16. A program storage device readable by a machine, tangibly embodying a program of instructions executable by the machine to perform method steps for handling outgoing communication requests in an information handling system in which outgoing communication requests are accumulated into a block that is written to an input/output (I/O) device, the method steps comprising:
   accumulating outgoing communication requests into a block;
   generating a blocking factor representing a predetermined size that is attained before the block is written to the I/O device;
   writing the block to the I/O device when it has attained the predetermined size; and
   dynamically adjusting the blocking factor in accordance with the volume of the requests.

17. The program storage device of claim 16 in which the writing step comprises:
   determining whether a new request produces a block of the predetermined size; and
   writing the block to the I/O device if the new request produces a block of the predetermined size.

18. The program storage device of claim 17 in which the writing step further comprises:
   determining whether any request in the block has been stalled in the block for more than a predetermined interval; and
   writing the block to the device if any request in the block has been stalled in the block for more than the predetermined interval.

19. The program storage device of claim 16 in which the adjusting step comprises:
   determining an actual throughput rate for the requests;
   comparing the actual throughput rate with a target throughput rate for the requests; and
   modifying the blocking factor in accordance with the comparison of the actual throughput rate with the target throughput rate.

20. The program storage device of claim 19 in which the modifying step comprises:
   counting the number of times that a block remains stalled for more than a predetermined interval; and
   decrementing the blocking factor if a block remains stalled for more than a predetermined interval more than a predetermined number of times.

* * * * *